United States Patent [19]

Moriya et al.

[11] Patent Number: 4,648,206
[45] Date of Patent: Mar. 10, 1987

[54] WINDOW GLASS RAISING AND LOWERING APPARATUS

[75] Inventors: Masaichi Moriya, Chigasaki; Junichi Maekawa; Takeshi Nakamura, both of Yokohama, all of Japan

[73] Assignee: Ohi Seisakusho Co., Ltd., Yokohama, Japan

[21] Appl. No.: 810,343

[22] Filed: Dec. 18, 1985

[30] Foreign Application Priority Data

Dec. 20, 1984 [JP] Japan ............................. 59-269308
Mar. 30, 1985 [JP] Japan ............................. 60-67776
Mar. 30, 1985 [JP] Japan ............................. 60-67777

[51] Int. Cl.$^4$ ........................................... E05F 11/48
[52] U.S. Cl. ........................................... 49/352; 49/374; 49/375
[58] Field of Search ................. 49/352, 374, 375, 227

[56] References Cited

U.S. PATENT DOCUMENTS 2,555,859  6/1951  Rappl et al. ........................... 49/352
3,427,748  2/1969  Marr ...................................... 49/352

FOREIGN PATENT DOCUMENTS 53-62059  6/1978  Japan .
55-14231  4/1980  Japan .
1448795   9/1976  United Kingdom ................. 49/352

Primary Examiner—Kenneth Downey
Attorney, Agent, or Firm—Schwartz, Jeffery, Schwaab, Mack, Blumenthal & Evans

[57] ABSTRACT

In a vehicle glass raising and lowering apparatus, a frame is provided comprising a pair of spaced guide rails held in a parallel disposition by a pair of transverse brackets. A carrier plate is slidably mounted on each guide rail for supporting a vehicle window glass secured thereto. Cable drive apparatus is connected to at least one of the carrier plates providing power reciprocation for the window glass. The apparatus being capable of insertion through a relatively narrow slot in a vehicle door.

8 Claims, 20 Drawing Figures

FIG.1 FIG.2
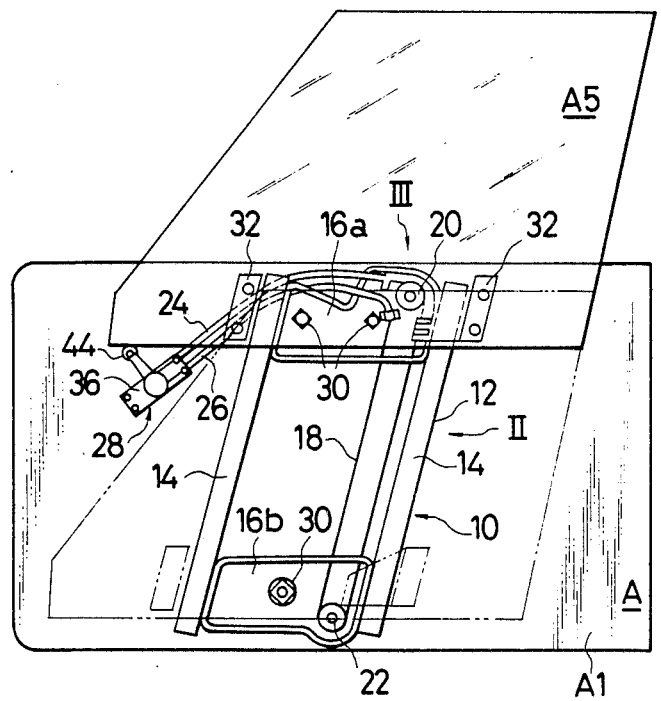
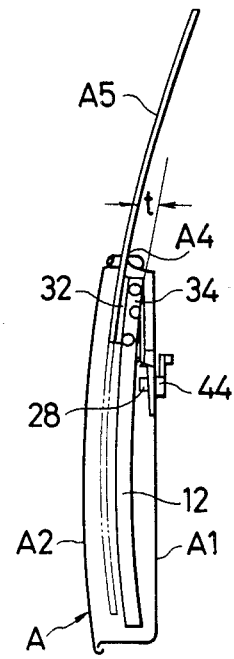
FIG.3
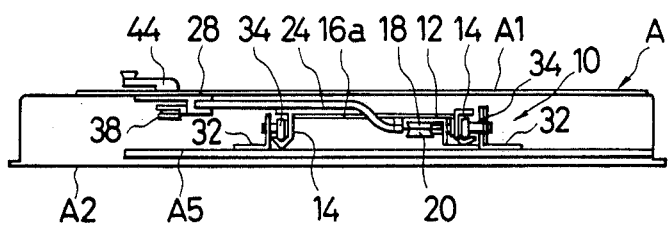

FIG.4
FIG.5
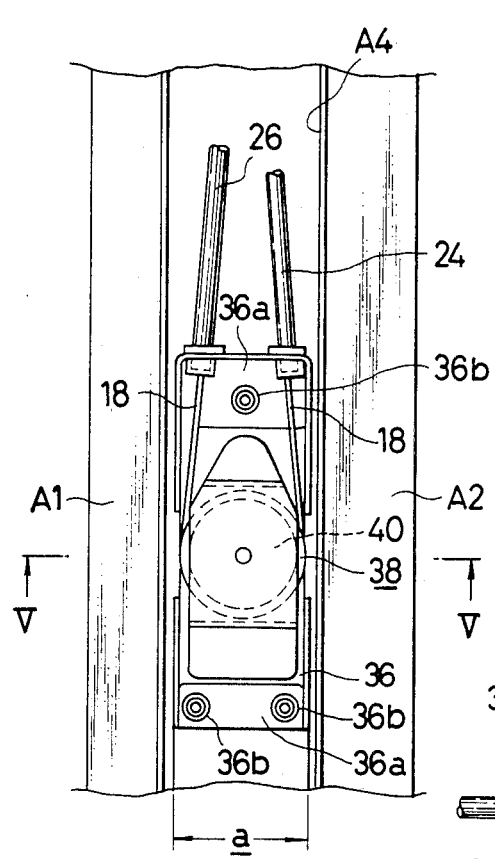
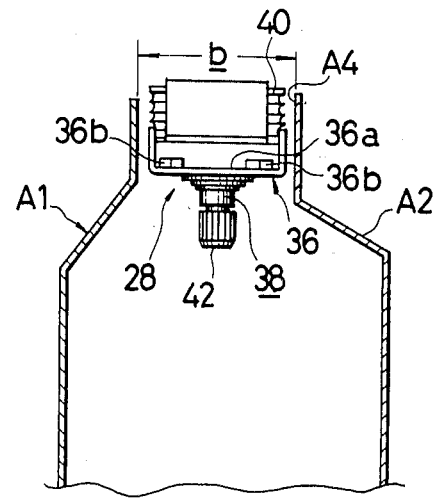
FIG.6
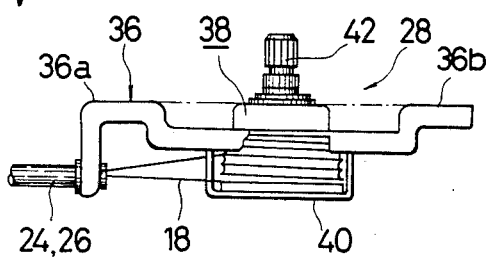
FIG.7
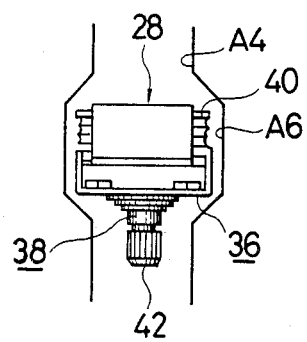

WINDOW GLASS RAISING AND LOWERING APPARATUS

FIELD OF THE INVENTION

This invention relates to a window glass raising and lowering apparatus to be used in the window of e.g. an automobile, and a method for mounting such an apparatus to a door of the automobile.

DESCRIPTION OF THE RELATED ART

The window glass raising and lowering apparatus basically comprising a support section for supporting a window glass and a drive section to move the window glass is installed in a door in the space between the inner panel and outer panel of the door. However, it is conventionally designed in pieces so as to be inserted through holes in the inner panel, whereby the pieces are assembled within the door. Because of this, it is difficult to modify the raising and lowering apparatus to a unit to increase the support strength of the window glass. The holes in the inner panel has to be large, therefore the strength of door is weakened. In addition, the mounting operation is not simple.

To strengthen the window glass support rigidity, installing two guide rails at the base of the frame is found to be effective. However, inserting that large of an item inside of the door through the holes is difficult. It may be thought that the raising and lowering apparatus could be inserted by way of the window glass insertion slot located between the inner panel and outer panel. However in this case if a drive shaft largely protruded from the drive section of the raising and lowering apparatus it could not pass through the insertion slot. Therefore it was suggested that the drive section should be divided up into parts so that these parts be installed inside of door.

In such a conventional window glass raising and lowering apparatus, because the drive section is divided into parts, the durability is comparatively less than one integrally assembled construction. In coping with this problem to increase the strength, there is a tendency of an increase of weight. More than this, there is the problem that because the drive section must be installed within the narrow door, it is divided up into parts. This requires complicated and unnecessary work. Also because the parts all have to be manufactured separately, a rise in cost of the whole mechanism cannot be avoided.

With reference to such a window glass raising and lowering apparatus, for example in a hard top automobile with no sash, due to the installation and space it is conventionally common practice to use only one guide rail in the window glass raising and lowering apparatus to guide the window glass, which is, e.g., shown in Patent Publication of Unexamined Application No. 53-62059.

In the window glass raising and lowering apparatus, having only one guide rail, the window glass is often caught or twisted during raising or lowering and the motion was not smooth. Because the support strength is not sufficient, stabilizers are necessary to prevent the window glass from vibration. The construction is complicated with many installations causing a rise in cost.

In addition for example in the hard top automobiles with no sash, wherein the window glass is guided by a carrier plate slidably fitted on the guide rail that runs along the locus of raising and lowering the glass, the guide rail is formed to fit along the curved shape the window glass. Therefore it is conventionally common practice to use sliders or rollers to swingably fit the carrier plate onto the guide rail or a point contact method is used for fitting to the changing shape. Such an example is shown in Patent Publication of Examined Application No. 55-14231.

In the window glass raising and lowering apparatus mentioned above, the construction is complicated and the cost is high. There is also the problem of vibration or shaking.

SUMMARY OF THE INVENTION

The primary object of present invention is to provide a window glass raising and lowering apparatus assembled in a unit.

Another objective of this invention is to provide a window glass raising and lowering apparatus of a simple construction to firmly support the window glass.

An objective of this invention is to provide a window glass raising and lowering apparatus that is designed so that the entire mechanism assembled in a unit can be installed through the glass window insertion slot in the installation section such as a door.

Another objective of this invention is to provide a window raising and lowering appartus having a pair of guide rails with a cross-section of high rigidity to firmly support the window glass.

Another object of this invention is to provide a window glass raising and lowering apparatus wherein the guide rails and carrier plates are slidably fitted by way of an elastic slider, with a proper amount of relief space provided to absorb the errors.

Another object of this invention is to provide a window glass raising and lowering apparatus which is strong so as to be capable of supporting the window glass and the installation of which is made so as not to divide the drive section into parts, wherein the whole unit can be installed through the window glass insertion slot.

Another object of this invention is to provide a window glass raising and lowering apparatus wherein the guide rail is of cross section for high strength to provide a strong window glass support.

Another object of this invention is to provide a window glass raising and lowering apparatus wherein the window glass is not only raised or lowered smoothly but the construction and handling of the apparatus is simple with the number of installations and the total cost reduced.

In order to accomplish these objectives, the present invention provides an improved window glass raising and lowering apparatus assembled in a unit; which is readily inserted into the installation slot formed on the door and can smoothly move up and down the window glass.

BRIEF DESCRIPTION OF THE DRAWINGS

FIG. 1 is a front view showing the installation of the raising and lowering apparatus in a door, for an example of this invention.

FIG. 2 is a view of the portion indicated by arrow II of FIG. 1.

FIG. 3 is a view of the portion indicated by arrow III of FIG. 1.

FIG. 4 is plan view of the drive section during installation.

FIG. 5 is a cross sectional view of the portion indicated by line V—V of FIG. 4.

FIG. 6 is plan view of the drive section.

FIG. 7 is plan view of another example of the drive section during installation.

DETAILED DESCRIPTION OF THE DRAWING

Figure 8:
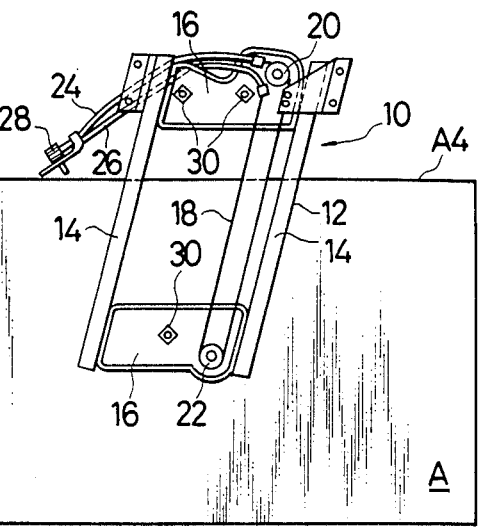
FIG. 8 and FIG. 9 are outline drawings explaining the installation of the raising and lowering apparatus.

Below is an explanation of examples of the application of the invention based on the drawings.

As is shown in FIGS. 1 to 3, a raising and lowering apparatus 10 is arranged inside a door A and a window glass A5 is made to raise or lower by the apparatus 10.

The raising and lowering apparatus 10 is made up of a frame base member 12 comprising a pair of guide rails 14 which run in the direction of raising and lowering the window glass A5 in the installation section of door A, and a pair of upper and lower tie brackets 16a and 16b provided on the upper and lower end of both guide rails 14 to keep the guide rails 14 parallel. Drive cable 18 runs along one of the guide rails 14 and is wound around guide pulleys 20 and 22 on tie bracket 16.

Drive cable 18 extends from the top to the bottom of base member 12, makes a U-turn at the bottom around guide pulley 22 and returns to guide pulley 20 at the top. This portion of drive cable 18 which extends to the top and the portion of drive cable 18 which is wound around guide pulley are respectively inserted into flexible outer tubes 24 and 26 and extends to the drive section 28 and is connected to the drive section 28 by way of flexible outer tubes 24 and 26 and generally arranged in an L-shape.

The tie bracket 16a and 16b have an installation surface facing on inner panel A1 of door A. This installation surface is provided by welding with a weld nut 30 to which a bolt is threaded.

On guide rails 14, carrier plates 32 for securly mounting the window glass thereon are fitted by way of roller units and made to be slidable. Drive cable 18 is connected to carrier plate 32.

The thickness t of frame base member 12 to which all parts are arranged is designed to be smaller than the opening width b of the window glass insertion slot A4 between inner panel A1 and outer panel A2 of door A.

As can be understood from FIGS. 4 to 6, the drive section 28 has a base plate 36 and a winding element 38 of drive cable 18 which is located on base plate 36 and made capable of turing. Provided on one side of base plate 36 is a winding pulley 40 of winding element 38, while on the other side is a drive shaft 42. To the drive shaft 42, a manual handle 44 as shown in FIG. 3, or an actuator is attached.

Base plate 36 of the drive section 28 is made into an elongated shape. The cross sectional width a across the drive shaft 42 of drive section 28 is made smaller than the opening width b of window glass insertion slot A4 and at most to the extent of the diameter of winding pulley 40. Also the width is determined such that all parts are made so as not to become larger than the width. Installation surface 36a is engaged with inner panel A1 of door A. Installation bolts are threaded to threaded holes 36b provided in the installation surface 36a.

Outer tubes 24 and 26 are connected to the end of base plate 36 facing winding pulley 40. Drive cables 18 extend from outer tubes 24 and 26 wound around winding pulley 40.

A stabilizer which is conventionally mounted to the inner panel may be mounted to the upper tie bracket 16a.

The installation of the afore-mentioned window glass raising and lowering apparatus 10 is done in the sequence outlined below.

All of the parts of the window glass raising and lowering apparatus 10 are attached to frame base member 12. After positioning the drive cable 18 through the apparatus, drive section 28 is connected to frame base member 12 by way of outer tubes 24 and 26. By this, the whole mechanism is made into a single unit.

Figure 9:
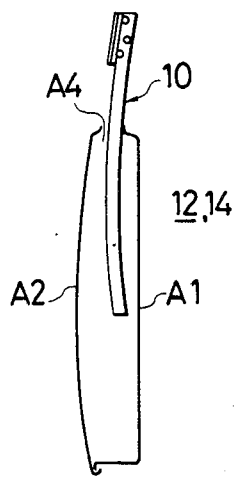

This single unit of the raising and lowering apparatus 10, as shown in FIG. 8 and 9, is inserted into door A through the window glass insertion slot A4 between inner panel A1 and outer panel A2 of the door A. After inserted to the proper location, drive section 28 may then be inserted through the window glass insertion slot A4.

In the installation condition, the drive shaft 42 of drive section 28 will protrude out from inner panel A1 of door A. When inserting it in insertion slot A4 of door A, it is turned into the insertion position as shown in FIG. 4, 5, and 8. In doing so, because outer tubes 24 and 26 and drive cable 18 are flexible to be twisted, there is no problem.

When the drive section 28 is faced in the afore-mentioned direction, since the width a of base plate 36 of drive section 28 is smaller than width b of window glass insertion slot A4, drive section 28 can easily be inserted into door A through insertion slot A4.

When the raising and lowering apparatus 10 is installed in door A in this manner, the installation surface of tie bracket 16 of base member 12 is engaged to the inner surface of inner panel A1 of door A, and then the bolts are threaded to weld nuts for fastening. In this way the unit is secured.

Drive shaft 28 is returned to its proper direction where drive shaft 42 is provided from inner panel A1. Installation surface 36a of the drive section 28 is engaged to inner panel A1 and fixed by bolts and threaded holes 36b. Handle 44 is then attached to drive shaft 42 which protrudes through inner panel A1 into the vehicle compartment.

Next, window glass A5 is inserted into door A through the window glass insertion slot A4 and the bottom of the window glass is attached to carrier plates 32 and 32a.

When handle 44 of the drive shaft is turned, winding section 38 and winding pulley 40 are turned, causing the following movement of cable 18. Carrier plate 32 connected to cable 18 raises or lowers and window glass A5 is opened or closed.

As shown in FIG. 7, it is also possible to make a wider section A6 in the window glass insertion slot A4 of door A so that drive section 28 may pass through the section A6. If this is done, there is an advantage that even if insertion slot A4 is generally narrow, drive section 28 can still pass through it.

Figure 10:
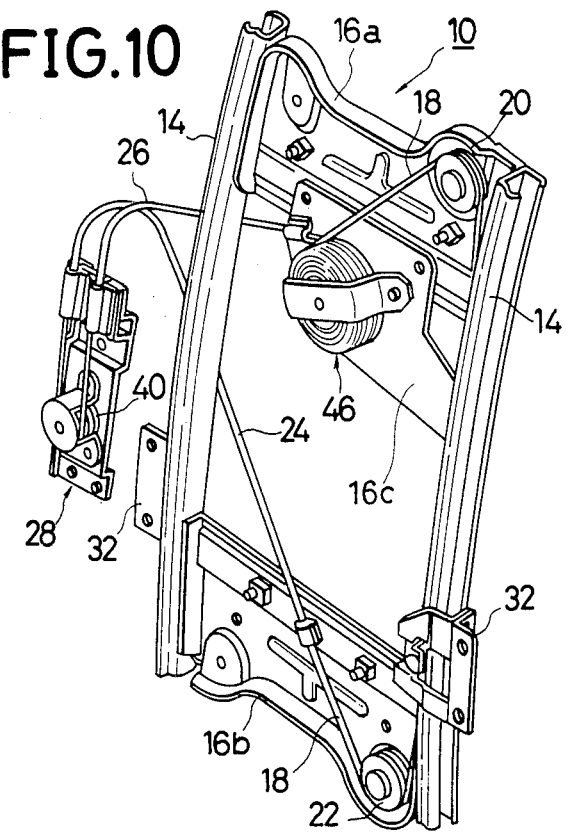
FIG. 10 is perspective view showing another example of the present invention.

FIG. 10 shows another example of the window glass raising and lowering apparatus 10 wherein a balance spring 46 is mounted to the upper bracket 16a or a mounting plate 16c positioned close to the upper bracket 16a. The balance spring 46 is smaller in size than the conventional one within a drum which is mounted to the door. The cables 18 are wound around a pulley surrounding the balance spring 46. The guide rails 14 have a cross section of U-shape, the opening of which is faced to the opposite directions.

The method of mounting the apparatus 10 is similar to that for the apparatus 10 in FIGS. 1 to 9.

Along with inserting the frame base member through the window glass insertion slot A4 of the installation section, the drive section 28 is changed to a suitable direction and also inserted through the same window glass insertion slot A4. The whole mechanism is made to be capable of insertion and installation through the window glass insertion slot.

Figure 11:
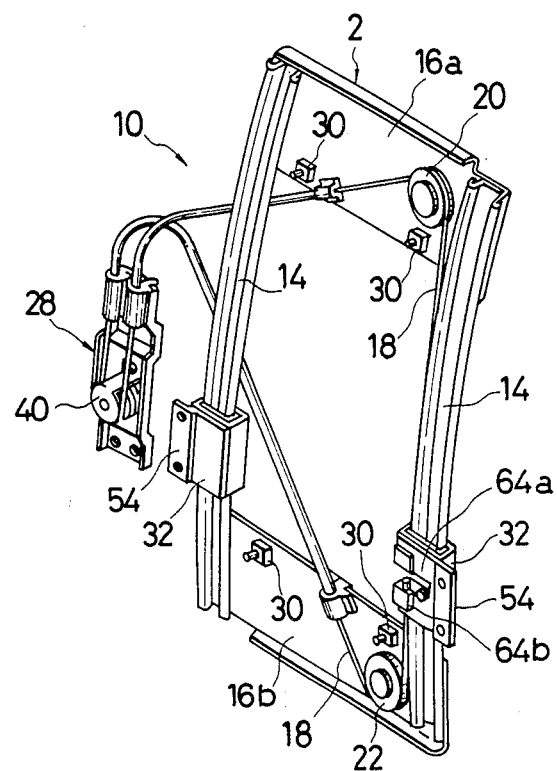
FIG. 11 is a perspective view showing another example of the present invention.

FIG. 11 shows another example of the raising and lowering apparatus 10, wherein the guide rails 14 have a cross-section of U-shape, the opening of which is faced to the same direction with the bottom attached to the tie brackets. The cross section of guide rail 14 is made up of side wall portions 48 which extend from bottom surface 50 forming a groove. Provided at the ends of side walls 48 are curls 52 which protrude to the outside surface. The curl structure allows to make the guide rail with a thinner sheet than the one used in FIG. 10. The whole guide rail 14 is in a curved shape and runs along the raising and lowering locus of window glass A5. Guide rail 14 can be produced using a rolling process.

Carrier plates 32 have a fitting 54 for supporting window glass A5. Also the cross section of carrier plates 32 has a grooved opening for inserting the curled portion 52 of guide rail 14. In other words, side wall portions 56 extend from bottom surface 58 to form a grooved cross section. Provided at the ends of side wall portions 56 are flanges 60 which bend inward. Fitting 54 is fixed to bottom surface 58.

Carrier plate 32 envelopes guide rail 14 with a slider therebetween, which is made of a synthetic resin and slidable but inseparable.

As can be understood from FIG. 11, the upper and lower tie brackets 16a and 16b have fitting nuts 30. Upper and lower guide pulleys 20 and 22 are arranged on tie brackets 16a and 16b close to one of the guide rails 14. Cables 18 are wound around upper and lower guide pulleys 20 and 22. Cables 18 between upper and lower pulleys 20 and 22 run along guide rail 14. One of the ends of cables 18 extends to the drive section 28 for manual operation and winds around drive pulley 40.

The assembling is similar to those mentioned previously.

Carrier plates 32 attached to window glass A5 are fitted on guide rails 14. One ends of cables 18 are connected to the drive section 28. The other ends of cables 18 are connected to cable linkages 64a and 64b of the carrier plate 32 and as drive pulley 40 is rotated, the motion is transmitted by way of cables 18 to drive the carrier plate 32.

The carrier plate 32 may be provided with a means to keep tension of the cable 18 for long use. The means comprises a ball attached to the end of the cable and a spring means to bias the ball to pull the cable for tension.

When drive pulley 62 for manual drive is turned, cables 18 are loosened or tightened and carrier plate 32 which is fixed to cables 18 is raised and lowered being guided by guide rail 14. The window glass A5, which is fixed to the carrier plates 32, is then raised or lowered to open or close the window.

Figure 12:
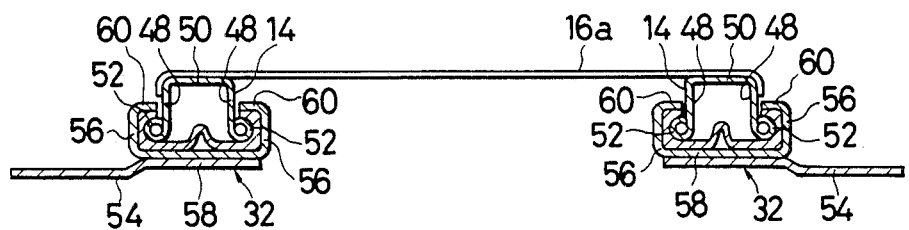
FIG. 12 is a horizontal sectional view of the raising and lowering apparatus.

Because guide rail 14 has a grooved cross section and is also prepared with curled section as shown in FIG. 12, the section modules is large. In addition, since guide rail 14 is supported by upper and lower tie brackets 16a and 16b, carrier plate 32 and other portions are capable of smooth operation without vibration etc.

The whole mechanism may be handled as a single unit and may be installed by way of nuts.

Figure 13:
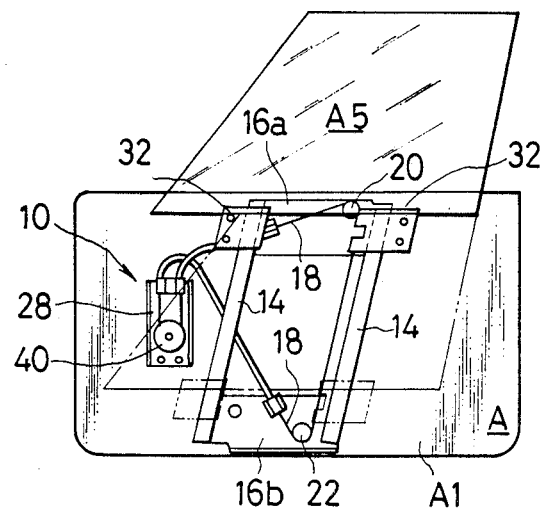
FIG. 13 is a front elevational view of the installed condition of the same.

FIG. 13 is a view similar to FIG. 1, but shows another arrangement of cables 18 and drive section 28.

Figure 14:
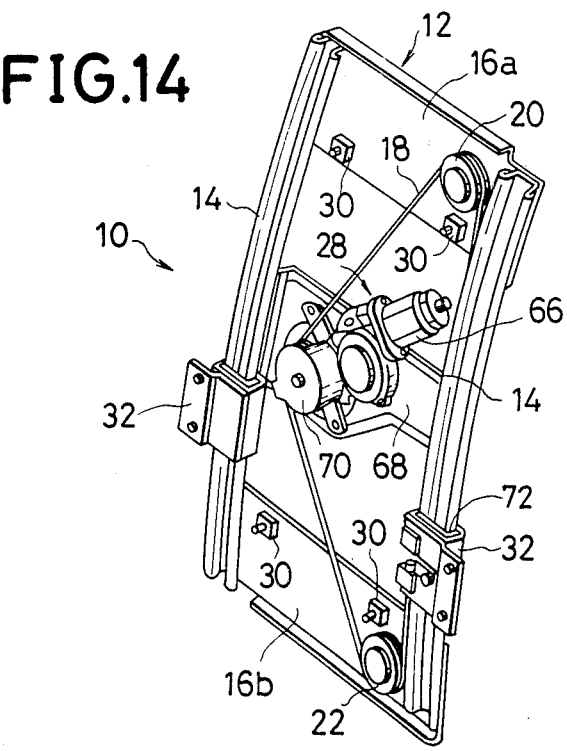
FIG. 14 is a perspective view of another example of this invention.

FIG. 14 shows another example of the application of this invention wherein the power drive section 28 has a motor 66, wormgear and reduction means and is connected to a mounting plate 68 provided substantially at the center portion, and cables 18 for transmitting the rotation power of the motor are connected to a drive pulley 70. In this example, there is no need to provide the outer tubes 24 and 26, and an electric wire with a connector may extend from the motor.

Figure 15:
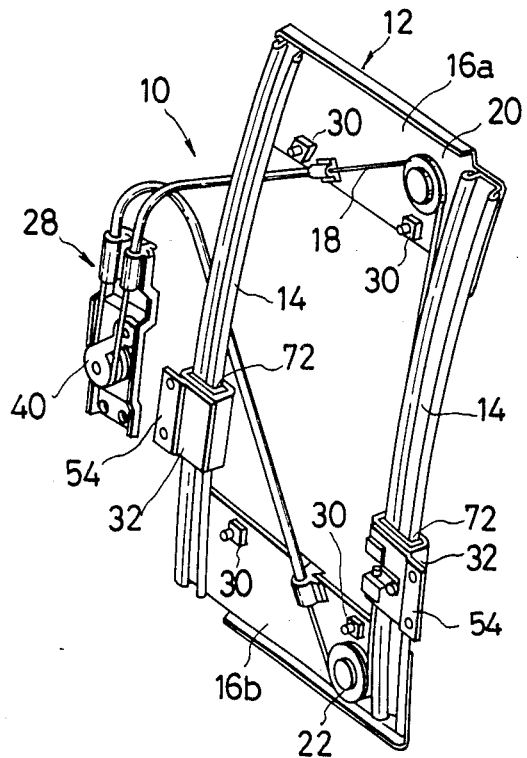
FIG. 15 is a perspective view of the raising and lowering apparatus for another embodiment of this invention.

FIG. 15 shows another example of the window glass raising and lowering apparatus 10.

Carrier plates 32 envelope the corresponding guide rails 14, and are fitted onto guide rails 14 and made slidable but inseparable by way of a slider 72 which is inserted into holes at the base of side walls 48.

Figure 16:
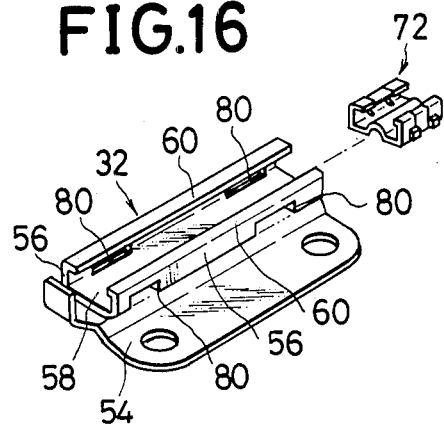
FIG. 16 is an exploded view showing the fitting relationship of the carrier plate and slider.
Figure 17:
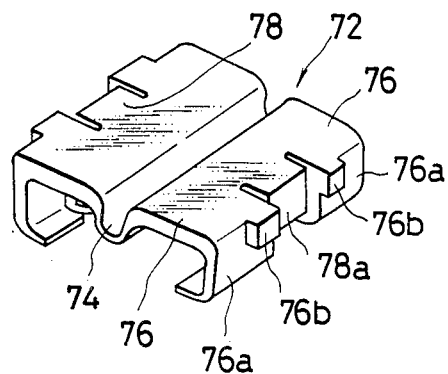
FIG. 17 is a perspective drawing of the slider.

Slider 72 is a single piece of synthetic resin possessing good elasticity. There are two sliders 72 fixed to each carrier plate 32. As is shown in FIG. 16, slider 72 has a shape which matches the inner grooved surface of carrier plate 32. As shown in FIG. 17, it is made up of an axial recess portion or flexible portion 74 in the center and support sections 76 which are on both sides of the portion 74 running in the axial direction of the recess portion 74. Provided between support sections 76 is a slide portion 78.

Figure 18:
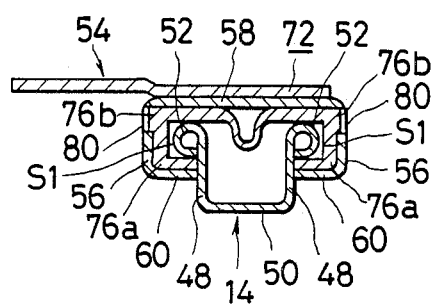
FIG. 18 is a cross sectional view close to the support section showing the fitting relationship between the carrier plate and slider.

On both wing sections 76a on supports sections 76 are protrusions 76b which fit into holes 80 of carrier plate 32. As can be understood from FIG. 18, the inside of wings 76a has relief space S1 which faces curled section 52 of guide rail 14. It is pressed against side walls 56 of carrier plate 32 by the elastic force of flexible portion 74, separating from the guide rail 14 to securly hold the slider 72 without interference to the guide rail 14.

Figure 19:
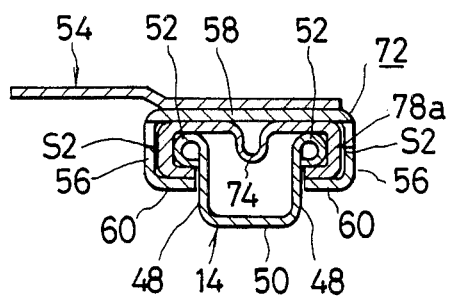
FIG. 19 is a cross sectional view close to the slide section of the carrier plate and slider.
Figure 20:
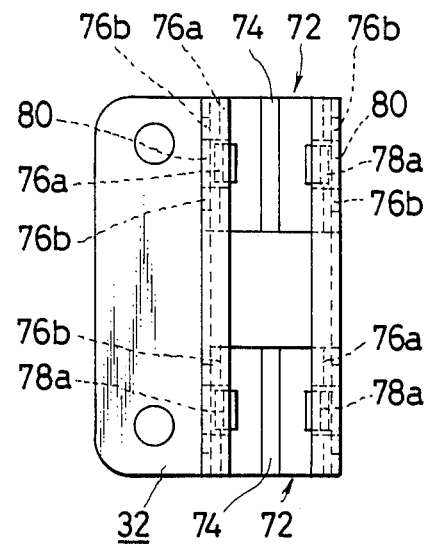
FIG. 20 is the rear view of the same.

Wings 78a of slide section 78 are flexible and changeable, and produce relief space S2 facing side wall 56 of carrier plate 32 as shown in FIG. 19. Through this flexible force, the slider 72 elastically contacts to curled section 52 of guide rail 14.

The slider held by the carrier plate between the carrier plate and guide rail 14 does not interfere with the guide rail 14 when the carrier plate moves because the support section 76 is connected to the carrier plate under pressure and released from the guide rail 14. The slide section is released from the carrier plate 32 and elastically attached to the guide rail 14, therefore surely fitting the carrier plate 32 onto the guide rail 14 during sliding. Consequently the small errors and distortions of the guide rail 14 are absorbed by the elasticity and smooth movement is obtained.

Although not shown in the drawings, a roller may be positioned within the carrier plate 32 so as to sandwich, the curled section of the guide rail 14 between the slider 70 and the roller.

In operation, when drive pulley 40 of manual drive is driven, cable 18 is loosened or tightened and carrier plate 32 is raised or lowered, raising or lowering the attached window glass A5, opening or closing it, which is similer to the operation in the previous examples.

In the slider 72 between guide rail 14 and carrier plate 32, both wings 76a of support sections 76 are firmly fixed to carrier plate 32 by way of the elastic force of flexible section. Also both wings 78a of slide sections 78 envelope curled section 52 of guide rail 14 by the elastic force. By relief space S1 and relief space S2 the production and installation errors of guide rail 14 or carrier plate are absorbed. Therefore there is no interference or vibration of carrier plate and smooth motion is obtained.

The mechanism can be attached to the door as a whole unit by way of nuts only.

Many modifications will be possible for a person skilled in the art. For example, a single broad bracket can be used in lieu of the upper and lower brackets although it may increase the total weight of the apparatus.

What is claimed is:

1. A window glass raising and lowering apparatus comprising a frame base member comprising a pair of guide rails and a pair of tie brackets for keeping said pair of guide rails parallel to each other, a carrier plate slidably connected to each of said guide rails to support a window glass fixedly connected thereto, a driving section for supplying power to drive at least one of said carrier plates, and a cable means connected between said drive section and said at least one of said carrier plates to transmit said power of said driving section to said carrier plate and said apparatus being adapted to be inserted through a relatively narrow insertion slot into an installation member to which said apparatus is mounted, wherein said driving section is separated from and connected through a pair of generally parallel outer tubes with said frame base member and adapted to be mounted on said installation member for manual operation, said cable means extend through said outer tubes as said cable means travel to and from said driving section, said guide rails are situted along the locus of raising and lowering the window glass, a drive cable from said cable means which runs along one of the said guide rails is connected to said carrier plate through one end of said drive cable, and said drive section having a drive shaft to which shaft a suitable manual driving means is fixed, wherein the thickness of the said frame base member to which all parts are attached is determined by the thickness of the insertion slot of said installation member and the width of the drive shaft of said drive section is also determined by the thickness of the insertion slot.

2. The window glass raising and lowering apparatus of claim 1, wherein said driving section is mounted to said frame base member for power operation.

3. A window glass raising and lowering apparatus comprising a frame base member comprising a pair of guide rails and a pair of tie brackets for keeping said pair of guide rails parallel to each other, a carrier plate slidably connected to each of said guide rails to support a window glass fixedly connected thereto, a driving section for supplying power to drive at least one of said carrier plates, and a cable means connected between said drive section and said at least one of said carrier plates to transmit said power of said driving section to said carrier plate and said apparatus being adapted to be inserted through a relatively narrow insertion slot into an installation member to which said apparatus is mounted wherein each of said guide rails is substantially of a U-shape having a bottom portion and a pair of side wall portions, said bottom portion being attached to said tie brackets and each said side wall portion having an edge portion which is curled outwardly to be enveloped by said carrier plate.

4. The window glass raising and lowering apparatus of claim 1, wherein said carrier plate has a slider or resin through which said carrier plate engaged with said guide rail.

5. A window glass raising and lowering apparatus comprising a frame base member comprising a pair of guide rails and a pair of tie brackets for keeping said pair of guide rails parallel to each other, a carrier plate sidably connected to each of said guide rails to support a window glass fixedly connected thereto, a driving section for supplying power to drive at least one of said carrier plates, and a cable means connected between said drive section and said at least one of said carrier plates to transmit said power of said driving section to said carrier plate and said apparatus being adapted to be inserted through a relatively narrow insertion slot into an installation member to which said apparatus is mounted, wherein each of said guide rails is substantially of a U-shape having a bottom portion and a pair of side wall portions; said carrier plate has a slider of resin through which said carrier plate engages said guide rail, said slider having substantially a channel shape comprising a bottom portion and a pair of leg portions and said carrier plate having a portion to receive said slider, said bottom portion having an axial recess portion recessed in the outer surface and raised in the inner surface of said bottom portion to provide said slider with lateral elasticity, each of said leg portions having a protrusion for interlocking with said carrier plate, a support section wing portion to provide a first relief space facing said side wall portion of said guide rail and a slide section wing portion a second relief space facing said carrier plate.

6. A window glass raising and lowering apparatus comprising a frame base member comprisin a pair of guide rails and a pair of tie brackets for keeping said pair of guide rails parallel to each other, a carrier plate slidably connected to each of said guide rails to support a window glass fixedly connected thereto, a driving section for supplying power to drive at least one of said carrier plates, and a cable means connected between said drive section and said at least one of said carrier plates to transmit said power of said driving section to said carrier plate and said apparatus being adapted to be inserted through a relatively narrow insertion slot into an installation member to which said apparatus is mounted wherein said carrier plate has a slider of resin through which said carrier plate engages said guide rail and said slider has a support section engaged with said carrier plate under pressure to provide a first relief space with respect to said guide rail and a slide section resiliently and slidably engaged with said guide rail to provide a second relief space with respect to said carrier plate.

7. A window glass raising and lowering apparatus comprising a frame base member comprising a pair of guide rails which run up and down and are arranged so as to move along the locus of raising and lowering the window glass; a cable means a portion of which runs along one of the guide rails, a carrier plate to which the window glass is attached being adapted to move on the guide rail and one end of the said cable means fixed to the carrier plate wherein said window is raised or lowered by loosening and tighting said cable, the cross section of the said guide rail is grooved with a curled portion formed at the end of both side walls.

8. A window glass raising and lowering apparatus comprising a frame base member comprising a pair of guide rails positioned along the locus of raising and lowering and a pair of tie brackets for keeping said pair of guide rails parallel to each other, a carrier plate slidably connected to each of said guide rails to suoport a window glass fixedly connected thereto, a driving section for supplying power to drive at least one of said carrier plates, and a cable means connected between said drive section and said at least one of said carrier plates to transmit said power of said driving section to said carrier plate and said apparatus being adapted to be inserted through a relatively narrow insertion slot into an installation member to which said apparatus is mounted, a drive cable from said cable means that runs along one of said guide rails to a carrier plate slidably attached to said guide rail to carry a window glass, wherein when said drive cable attached to the carrier plate is loosened or tightened, the window glass is caused to raise or lower; a slider provided between said carrier plate and said guide rail and having a first relief space which faces said guide rail to apply pressure against said carrier plate and a second relief space which faces said carrier plate to elastically press against said guide rail.

* * * * *